US 8,389,621 B2
Mar. 5, 2013

(12) United States Patent
Kwon et al.

(10) Patent No.: US 8,389,621 B2
(45) Date of Patent: Mar. 5, 2013

(54) THERMOSETTING RESIN COMPOSITION FOR PRODUCING COLOR FILTER FOR CMOS IMAGE SENSOR, COLOR FILTER COMPRISING TRANSPARENT FILM FORMED USING THE COMPOSITION AND CMOS IMAGE SENSOR USING THE COLOR FILTER

(75) Inventors: O Bum Kwon, Seoul (KR); Kil Sung Lee, Gwacheon-si (KR); Jae Hyun Kim, Seongnam-si (KR); Jung Hyun Kim, Pyeongtaek-si (KR)

(73) Assignee: Cheil Industries Inc., Gumi-si (KR)

( * ) Notice: Subject to any disclaimer, the term of this patent is extended or adjusted under 35 U.S.C. 154(b) by 271 days.

(21) Appl. No.: 12/915,188

(22) Filed: Oct. 29, 2010

(65) Prior Publication Data

US 2011/0037038 A1  Feb. 17, 2011

Related U.S. Application Data

(60) Division of application No. 12/116,314, filed on May 7, 2008, now Pat. No. 7,847,013, which is a continuation-in-part of application No. 11/965,856, filed on Dec. 28, 2007, now abandoned.

(30) Foreign Application Priority Data

Jun. 19, 2007  (KR) .................. 10-2007-0059842

(51) Int. Cl.
*C08F 220/06* (2006.01)
*C08F 220/28* (2006.01)
*C08F 220/32* (2006.01)
*C08F 226/06* (2006.01)
*C08F 226/10* (2006.01)
*C08L 33/02* (2006.01)
*C08L 33/14* (2006.01)
*C09K 19/00* (2006.01)
*H01L 31/00* (2006.01)

(52) U.S. Cl. ........ 524/548; 257/440; 428/1.1; 428/1.33; 524/555; 524/558; 525/103; 525/117; 525/169; 525/170; 525/182; 525/203; 525/208; 526/258; 526/259; 526/273

(58) Field of Classification Search .................. None
See application file for complete search history.

(56) References Cited

U.S. PATENT DOCUMENTS

| 3,629,197 | A | 12/1971 | Stiehl, Jr. |
| 5,449,557 | A | 9/1995 | Liebler et al. |
| 6,309,790 | B1 | 10/2001 | Jung et al. |
| 7,514,199 | B2 | 4/2009 | Uh et al. |
| 7,722,932 | B2 | 5/2010 | Kwon et al. |
| 2006/0084736 | A1 | 4/2006 | Jang et al. |
| 2007/0059546 | A1 | 3/2007 | Kwon et al. |
| 2007/0187794 | A1 | 8/2007 | Fukuyoshi et al. |
| 2008/0319145 | A1 | 12/2008 | Kwon et al. |

FOREIGN PATENT DOCUMENTS

| CN | 1932559 A | 3/2007 |
| CN | 101104660 A | 1/2008 |
| JP | 62-163016 A | 7/1987 |
| JP | 63-131103 A | 6/1988 |
| JP | 1-134306 A | 5/1989 |
| JP | 07-278516 A | 10/1995 |
| JP | 08-050289 A | 2/1996 |
| JP | 08-201617 A | 8/1996 |
| JP | 2000-034319 | 2/2000 |
| JP | 2000-239497 | 9/2000 |
| JP | 2003-507758 T | 2/2003 |
| JP | 2006-113547 | 4/2006 |
| JP | 2007-079527 | 3/2007 |
| JP | 2007-090782 | 4/2007 |
| JP | 2007-178974 | 7/2007 |
| JP | 2008-020873 | 1/2008 |
| WO | 01/13175 A2 | 2/2001 |
| WO | 2006/134740 A1 | 12/2006 |

*Primary Examiner* — Robert Sellers
(74) *Attorney, Agent, or Firm* — Summa, Addition & Ashe, P.A.

(57) ABSTRACT

A thermosetting resin composition for producing a color filter for a CMOS image sensor is provided. The thermosetting resin composition comprises an organic solvent and a self-curing copolymer having structural units represented by Formulae 1, 2, 3 and 4, which are described in the specification.

13 Claims, 3 Drawing Sheets

THERMOSETTING RESIN COMPOSITION FOR PRODUCING COLOR FILTER FOR CMOS IMAGE SENSOR, COLOR FILTER COMPRISING TRANSPARENT FILM FORMED USING THE COMPOSITION AND CMOS IMAGE SENSOR USING THE COLOR FILTER

CROSS-REFERENCE TO RELATED APPLICATION

This non-provisional application is a divisional of U.S. application Ser. No. 12/116,314, filed May 7, 2008, now U.S. Pat. No. 7,847,013, which is itself a continuation-in-part of U.S. application Ser. No. 11/965,856, filed Dec. 28, 2007 now abandoned, each of which is hereby incorporated by reference in their entirety, and claims priority therefrom under 35 USC Section 120. This application also claims priority under 35 USC Section 119 from Korean Patent Application No. 10-2007-0059842, filed on Jun. 19, 2007, which is also hereby incorporated by reference in its entirety.

FIELD OF THE INVENTION

The present invention relates to a thermosetting resin composition for producing a color filter for a CMOS image sensor, a color filter comprising a transparent film formed using the composition, and a CMOS image sensor using the color filter.

BACKGROUND OF THE INVENTION

Color filters used in an image sensor can include a transparent film formed under or on the surface of the color filter to improve flatness and to protect the color filter. The transparent film must be optically transparent in the visible region, have high film strength and exhibit sufficient heat and chemical resistance to withstand subsequent processes such as heating, cleaning, development and etching after forming the transparent film. In particular, an underlying transparent film of a color filter for an image sensor should be capable of suppressing the reflection of UV rays which are irradiated to pattern a color resist, to thereby prevent the occurrence of pattern defects in the color filter by various adverse factors such as halation and standing waves.

Japanese Patent Publications Nos. Hei 1-134306, Sho 62-163016 and Sho 63-131103 disclose compositions for transparent films for color filters comprising glycidyl methacrylate, polyimide and a mixture of a melamine resin and an epoxy resin as the primary components, respectively.

Epoxy resin compositions can be used to produce protective films for color filters having reliable adhesive strength, heat resistance, chemical resistance and water resistance. For instance, Japanese Patent Publication No. Hei 08-050289 teaches a curable resin composition comprising a glycidyl methacrylate polymer and a phenolic curing agent. Further, Japanese Patent Publication No. Hei 08-201617 teaches a resin composition for a transparent film comprising an epoxy resin, a curing agent and an organic solvent wherein the curing agent is a reaction product of a styrene-maleic anhydride copolymer and an amine.

Generally epoxy resins are mixed with curing agents (so-called "two-part compositions") immediately before use due to their rapid reaction with the curing agents. It is known that epoxy resins are unsuitable for use in the preparation of one-part compositions. Two-part compositions, however, are complicated to handle and unsuitable for industrial-scale preparation.

None of the aforementioned prior art techniques discloses one-part compositions comprising an epoxy resin while simultaneously satisfying the requirements for transparency, film strength, heat resistance, acid resistance and alkali resistance. Further, a transparent film for a color filter capable of absorbing UV light has not yet been developed.

SUMMARY OF THE INVENTION

In accordance with one aspect of the present invention, there is provided a thermosetting resin composition for producing a color filter. The thermosetting resin composition of the invention can exhibit excellent adhesive strength, transparency, film strength, heat resistance, acid resistance, alkali resistance and long-term storage stability and can absorb UV light of a particular wavelength.

The thermosetting resin composition of the invention comprises an organic solvent and a self-curing copolymer having structural units represented by Formulae 1, 2, 3 and 4:

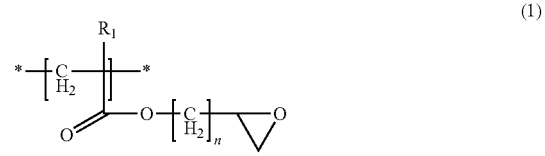

(1)

wherein $R_1$ is a hydrogen atom or a methyl group and n is an integer from 1 to 10;

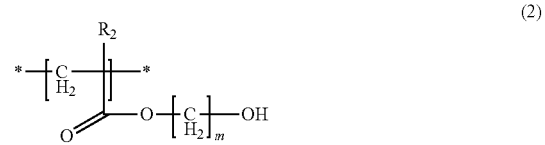

(2)

wherein $R_2$ is a hydrogen atom or a methyl group and m is an integer from 1 to 10;

(3)

wherein $R_3$ is a hydrogen atom or a methyl group; and

(4)

wherein $R_4$ is a hydrogen atom or a methyl group and Z is selected from the following groups:

(5)

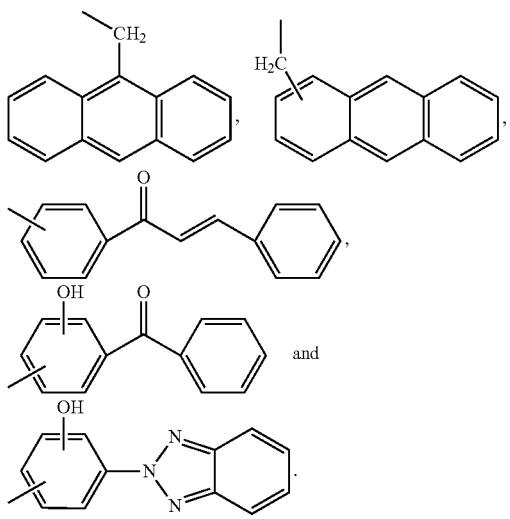

and

The self-curing copolymer can include about 5 to about 90 mol % of the structural unit of Formula 1, about 1 to about 30 mol % of the structural unit of Formula 2, about 1 to about 30 mol % of the structural unit of Formula 3, and about 0.5 to about 20 mol % of the structural unit of Formula 4.

The self-curing copolymer may further include a structural unit of Formula 6:

(6)

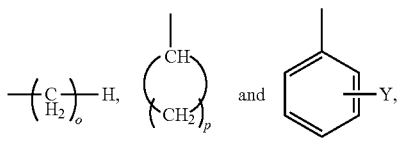

wherein X is selected from $-\left(\underset{H_2}{C}\right)_o-H$, $\left(\underset{CH_2}{CH}\right)_p$ and ⌬—Y, o is an integer from 1 to 4, p is an integer from 4 to 12, and Y is selected from a hydrogen atom, $C_1$-$C_4$ lower alkyl groups and $C_1$-$C_4$ lower alkoxy groups.

The structural unit of Formula 6 can be present in an amount of about 0.5 to about 20 mol %.

The self-curing copolymer can have a weight-average molecular weight ranging from about 1,000 to about 1,000,000.

The thermosetting resin composition of the present invention may further comprise an epoxy compound.

The thermosetting resin composition of the present invention may comprise about 1 to about 45% by weight of the self-curing copolymer, about 1 to about 45% by weight of the epoxy compound, and the balance of the organic solvent.

The epoxy compound can be selected from the group consisting of bisphenol A type epoxy, bisphenol F type epoxy, phenol novolak type epoxy, cresol novolak type epoxy and substituted epoxy compounds. These epoxy compounds may be used alone or as a mixture thereof.

The self-curing copolymer can further include at least one structural unit selected from the group consisting of: (meth) acrylates including methyl (meth)acrylate, ethyl (meth)acrylate, propyl (meth)acrylate, isopropyl (meth)acrylate, butyl (meth)acrylate, and benzyl (meth)acrylate; acrylamides including N-methylacrylamide, N-ethylacrylamide, N-isopropylacrylamide, N-methylolacrylamide, N-methylmethacrylamide, N-ethylmethacrylamide, N-isopropylmethacrylamide, N-methylolmethacrylamide, N,N-dimethylacrylamide, N,N-diethylacrylamide, N,N-dimethylmethacrylamide, and N,N-diethylmethacrylamide; styrenes including styrene, α-methylstyrene, and hydroxystyrene; N-vinylpyrrolidone; N-vinylformamide; N-vinylamide; and N-vinylimidazole.

The composition of the present invention may further comprise at least one polymer selected from poly(meth)acrylate, nylon, polyester, polyimide and polysilicon. The polymer can be present in an amount of about 50 parts by weight or less, based on 100 parts by weight of the self-curing copolymer.

In accordance with another aspect of the present invention, there is provided a color filter comprising a transparent film formed using the composition.

In accordance with still another aspect of the present invention, there is provided an image sensor using the color filter.

DETAILED DESCRIPTION OF THE INVENTION

Figure 1:
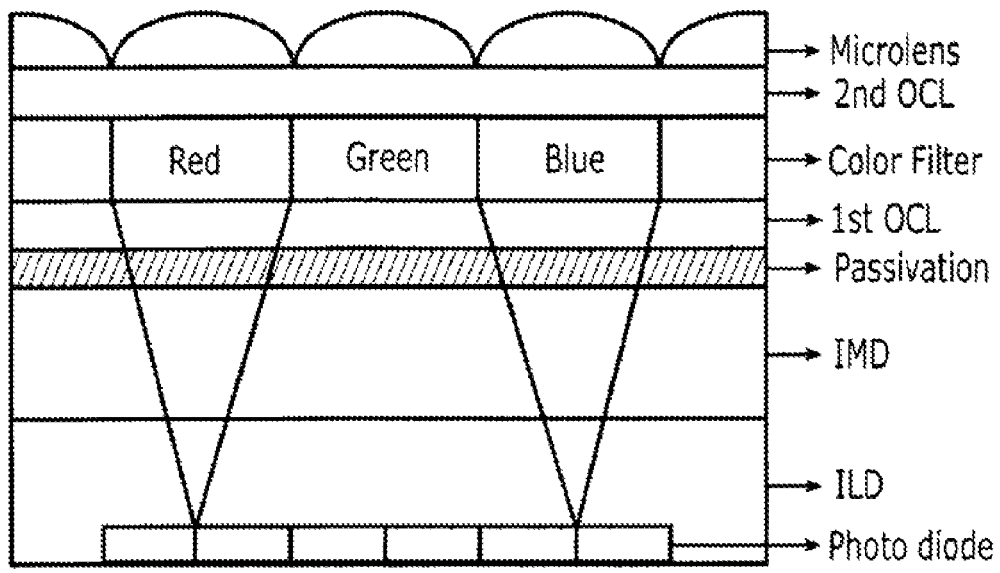
FIG. 1 is a schematic diagram illustrating the structure of a CMOS image sensor.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a thermosetting resin composition, which can be used to produce a color filter for a CMOS image sensor. Specifically, the thermosetting resin composition of the present invention comprises an organic solvent and a self-curing copolymer having ultraviolet light (UV) absorbing groups.

The self-curing copolymer has structural units represented by Formulae 1, 2, 3 and 4:

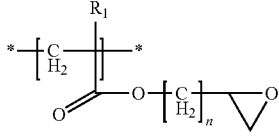
(1)

wherein $R_1$ is a hydrogen atom or a methyl group and n is an integer from 1 to 10;

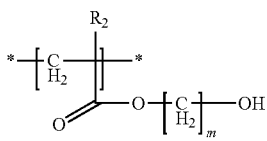
(2)

wherein $R_2$ is a hydrogen atom or a methyl group and m is an integer from 1 to 10;

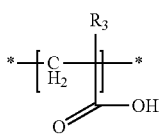
(3)

wherein $R_3$ is a hydrogen atom or a methyl group; and

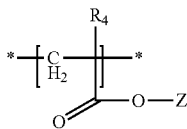
(4)

wherein $R_4$ is a hydrogen atom or a methyl group and Z is selected from the following groups:

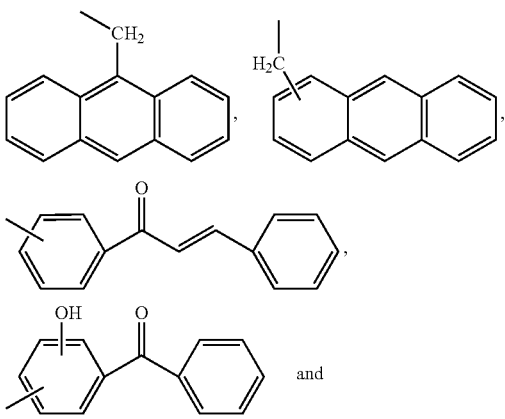
(5)

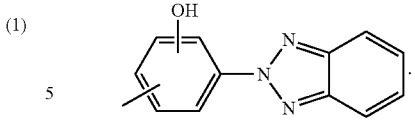

The self-curing copolymer has thermosetting properties because the structural unit of Formula 1 is thermally crosslinked with the structural units of Formulae 2, 3 and 4. The self-curing copolymer having the structural units of Formulae 1 to 4 may be of any type such as a random, alternating, block or graft copolymer.

The self-curing copolymer can include about 5 to about 90 mol % of the structural unit of Formula 1, about 1 to about 30 mol % of the structural unit of Formula 2, about 1 to about 30 mol % of the structural unit of Formula 3, and about 0.5 to about 20 mol % of the structural unit of Formula 4.

In particular, the structural unit of Formula 4 has a UV-absorbing group (Z). The presence of the group (Z) prevents the occurrence of pattern defects resulting from various adverse factors. As an example, referring to the mechanism illustrated in FIG. 2, when a color resist is exposed to light, unexposed portions of the color resist are not cured by re-reflection of UV light from an underlying substrate.

The self-curing copolymer may optionally further comprise a structural unit of Formula 6, the presence of which can improve the storage stability and film hardness of the composition:

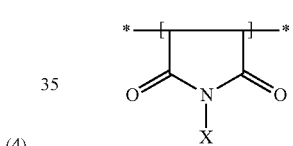
(6)

wherein X is selected from

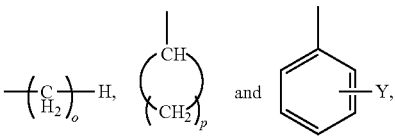

o is an integer from 1 to 4, p is an integer from 4 to 12, and Y is selected from a hydrogen atom, $C_1$-$C_4$ lower alkyl groups and $C_1$-$C_4$ lower alkoxy groups.

The structural unit of Formula 6 can be present in an amount of about 0.5 to about 20 mol %.

The weight-average molecular weight of the self-curing copolymer can be between about 1,000 and about 1,000,000. When the self-curing copolymer has a weight-average molecular weight less than about 1,000, the self-curing copolymer may not be sufficiently curable. Meanwhile, when the self-curing copolymer has a weight-average molecular weight greater than about 1,000,000, the copolymer may have reduced solubility or it may be difficult to apply the composition to a substrate. The self-curing copolymer can be present in the thermosetting resin composition in an amount of about 1 to about 45% by weight, based on the total weight of the composition.

The kind of the organic solvent used in the composition of the present invention is not particularly restricted. Examples of organic solvents useful in the invention include without limitation: ethylene glycols including ethylene glycol and diethylene glycol; glycol ethers including ethylene glycol monomethyl ether, diethylene glycol monomethyl ether, ethylene glycol diethyl ether, and diethylene glycol dimethyl ether; glycol ether acetates including ethylene glycol monoethyl ether acetate, diethylene glycol monoethyl ether acetate, and diethylene glycol monobutyl ether acetate; propylene glycols; propylene glycol ethers including propylene glycol monomethyl ether, propylene glycol monoethyl ether, propylene glycol monopropyl ether, propylene monobutyl ether, propylene glycol dimethyl ether, dipropylene glycol dimethyl ether, propylene glycol diethyl ether, and dipropylene glycol diethyl ether; propylene glycol ether acetates including propylene glycol monomethyl ether acetate and dipropylene glycol monoethyl ether acetate; amides including N-methylpyrrolidone, dimethylformamide, and dimethylacetamide; ketones including methyl ethyl ketone (MEK), methyl isobutyl ketone (MIBK), and cyclohexanone; petroleum solvents including toluene, xylene, and solvent naphtha; esters including ethyl acetate, butyl acetate, and ethyl lactate; and mixtures thereof.

The organic solvent makes up the remaining weight percent of the composition in addition to the contents of the self-curing copolymer and other components. The composition of the present invention may comprise the organic solvent in an amount of about 30 to about 99% by weight, for example about 70 to about 98% by weight, based on the total weight of the composition. If the composition includes less than about 30% by weight of the organic solvent, it can be difficult to apply the composition to a substrate. Meanwhile, if the composition includes more than about 99% by weight of the organic solvent, it can be difficult to form a sufficiently thick protective film.

For improvements in etching resistance and alkali resistance and the adjustment of fluidity, the composition may optionally further comprise an epoxy compound. The epoxy compound can be an epoxy compound selected from the group consisting of bisphenol A type epoxy, bisphenol F type epoxy, phenol novolak type epoxy, cresol novolak type epoxy and substituted epoxy compounds, and the like. These epoxy compounds may be used alone or as a mixture thereof. The epoxy compound can have a weight-average molecular weight ranging from about 50 to about 10,000. The content of the epoxy compound in the thermosetting resin composition can be in the range of about 1 to about 45% by weight, for example about 5 to about 30% by weight, based on the total weight of the resin composition. The presence of the epoxy compound in an amount of less than about 1% by weight can result in a degradation in the dimension stability of a transparent film formed using the composition. Meanwhile, the presence of the epoxy compound in an amount greater than about 45% by weight may make it difficult to apply the composition to a substrate.

To improve or impart other properties to the composition such as ease of application, film hardness and affinity for overlying and underlying films, the self-curing copolymer may optionally further include at least one repeating unit selected from the group consisting of: (meth)acrylates including methyl (meth)acrylate, ethyl (meth)acrylate, propyl (meth)acrylate, isopropyl (meth)acrylate, butyl (meth)acrylate, and benzyl (meth)acrylate; acrylamides including N-methylacrylamide, N-ethylacrylamide, N-isopropylacrylamide, N-methylolacrylamide, N-methylmethacrylamide, N-ethylmethacrylamide, N-isopropylmethacrylamide, N-methylolmethacrylamide, N,N-dimethylacrylamide, N,N-diethylacrylamide, N,N-dimethylmethacrylamide, and N,N-diethylmethacrylamide; styrenes including styrene, α-methylstyrene, and hydroxystyrene; N-vinylpyrrolidone; N-vinylformamide; N-vinylamide; and N-vinylimidazole; and the like, and mixtures thereof.

The self-curing copolymer can be synthesized using any suitable process known in the art. As a non-limiting example, the self-curing copolymer can be synthesized using a radical polymerization initiator in the same organic solvent as the thermosetting resin composition of the present invention.

The organic solvent used for the synthesis of the self-curing copolymer having UV-absorbing groups is not particularly restricted and can be the same as that of the thermosetting resin composition of the present invention. On the other hand, the amount of the organic solvent used in the polymerization can be controlled such that the self-curing copolymer is present in an amount of about 3 to about 50% by weight, for example about 5 to about 30% by weight, based on the weight of the solution of the self-curing copolymer in the organic solvent. When the concentration of the self-curing copolymer in the solution is less than about 3% by weight, the polymerization rate may be low and thus some of the monomers may remain unreacted. Meanwhile, when the concentration of the self-curing copolymer in the solution exceeds about 50% by weight, the solution can be too viscous to handle and to control the reaction rate.

Any known polymerization initiator can be used for the synthesis of the self-curing copolymer, including thermal polymerization initiators, photopolymerization initiators, and redox initiators. Peroxide type and azo type radical polymerization initiators can be useful in the invention because of ease of handling and controlling reaction rate and molecular weight.

Examples of peroxide type polymerization initiators that can be used in the present invention include methyl ethyl ketone peroxide, cyclohexanone peroxide, methyl cyclohexanone peroxide, acetyl acetone peroxide, 1,1-bis(tert-butylperoxy)-3,3,5-trimethylcyclohexane, 1,1-bis(tert-butylperoxy)cyclohexane, 1,1-bis(tert-hexylperoxy)-3,3,5-trimethylcyclohexane, 1,1-bis(tert-hexylperoxy)cyclohexane, 1,1-bis(tert-butylperoxy)cyclododecane, isobutyl peroxide, lauroyl peroxide, succinic acid peroxide, 3,5,5-trimethylhexanoyl peroxide, benzoyl peroxide, octanoyl peroxide, stearoyl peroxide, diisopropyl peroxydicarbonate, di-n-propyl peroxydicarbonate, di-2-ethylhexyl peroxydicarbonate, di-2-ethoxyethyl peroxydicarbonate, di-2-methoxybutyl peroxydicarbonate, bis-(4-tert-butylcyclohexyl) peroxydicarbonate, (α,α-bis-neodecanoylperoxy)diisopropylbenzene, cumyl peroxyneodecanoate, octyl peroxyneodecanoate, hexyl peroxyneodecanoate, tert-butyl peroxyneodecanoate, tert-hexyl peroxypivalate, tert-butyl peroxypivalate, 2,5-dimethyl-2,5-bis(2-ethylhexanoylperoxy)hexane, 1,1,3,3-tetramethylbutylperoxy-2-ethylhexanoate, peroxy-2-ethyl-tert-hexyl hexanoate, peroxy-2-ethyl-tert-butyl hexanoate, peroxy-2-ethyl-tert-butyl hexanoate, peroxy-3-methyl-tert-butyl propionate, tert-butyl peroxylaurate, tert-butylperoxy-3,5,5-trimethylhexanoate, tert-hexyl peroxyisopropyl monocarbonate, tert-butylperoxy isopropyl carbonate, 2,5-dimethyl-2,5-bis(benzoylperoxy)hexane, tert-butyl peracetate, tert-hexyl perbenzoate, tert-butyl perbenzoate, and the like and mixtures thereof. Combinations of the peroxide type polymerization initiators with reductants can be used as redox initiators.

Examples of azo type polymerization initiators that can be used in the present invention include 1,1-azobis(cyclohexane-1-carbonitrile), 2,2'-azobis(2-methyl-butyronitrile), 2,2'-azobisbutyronitrile, 2,2'-azobis(2,4-dimethyl-valeronitrile), 2,2'-azobis(2,4-dimethyl-4-methoxyvaleronitrile), 2,2'-azobis(2-amidino-propane) hydrochloride, 2,2'-azobis[2-(5-methyl-2-imidazolin-2-yl)propane]hydrochloride, 2,2'-azobis[2-(2-imidazolin-2-yl)propane]hydrochloride, 2,2'-azobis[2-(5-methyl-2-imidazolin-2-yl)propane], 2,2'-azobis[2-methyl-N-(1,1-bis(2-hydroxymethyl)-2-hydroxyethyl]propionamide, 2,2'-azobis[2-2-methyl-N-(2-hydroxyethyl)propionamide], 2,2'-azobis(2-methyl-propionamide) dihydrate, 4,4'-azobis(4-cyano-valeic acid), 2,2'-azobis(2-hydroxymethylpropionitrile), 2,2'-azobis(2-methylpropionic acid)dimethyl ester (dimethyl-2,2'-azobis(2-methylpropionate)), cyano-2-propylazoformamide, and the like, and mixtures thereof.

In addition to these peroxide and azo type polymerization initiators, at least one known molecular weight-controlling agent such as a chain-transfer agent, a chain-terminating agent or a polymerization promoter can be further added during synthesis of the self-curing copolymer to adjust the molecular weight of the self-curing copolymer to a range such as defined above. Suitable molecular weight-controlling agents can be mercaptopropionic acid, mercaptopropionate, thioglycol, thioglycerin, dodecylmercaptan, α-methylstyrene dimers, and the like, and mixtures thereof.

One or more solvents other than the organic solvent used for the preparation of the copolymer can be added for the purpose of assisting the solubility of the constituent component(s) and controlling the leveling properties and drying rate after the polymerization.

In addition, the copolymer can be extracted into a solid form for the purpose of purification, storage and solvent change by known techniques, without limitation, such as spray drying, film drying, dropping into poor solvents and re-dipping.

In order to improve etching resistance and alkali resistance and adjust fluidity, the composition of the present invention can further comprise at least one polymer of poly(meth)acrylate, nylon, polyester, polyimide, or polysilicon in an amount of about 50 parts by weight or less, based on 100 parts by weight of the self-curing copolymer.

A thermosetting catalyst can be further added to the thermosetting resin composition of the present invention. Exemplary thermosetting catalysts useful in the invention include amine compounds, phosphorus compounds, boron compounds, antimony compounds, carboxylic acid compounds, organic sulfonic acid compounds, and the like, and mixtures thereof. For good storage stability, the thermosetting catalyst can be added in an amount of about 10 parts by weight or less, based on 100 parts by weight of the self-curing polymer.

If required, the thermosetting resin composition of the present invention may be further blended with other known agents, e.g., antioxidants, UV stabilizers, plasticizers, leveling agents, fillers, and the like, and mixtures thereof.

The thermosetting resin composition of the present invention can be applied to a substrate using known techniques, e.g., screen printing, curtain coating, blade coating, spin coating, spray coating, dip coating, flow coating, roll coating or slit coating, to form a film. The film thus formed can have a thickness ranging from about 0.1 to about 3.0 μm, for example, about 0.2 to about 1.5 μm, after subsequent drying. If the film is thinner than about 0.1 μm, sufficient flatness relative to step height cannot be attained. Meanwhile, if the film is thicker than about 3.0 μm, the transmittance is lowered, considerable drying and curing time are required and the productivity is reduced.

The substrate coated with the thermosetting resin composition of the present invention can be dried and heat-cured to evaporate the solvent, and cured by crosslinking to form a sufficiently hard film. The drying and the heat-curing processes can be carried out simultaneously or separately. It can be advantageous to carry out the drying and heat-curing processes separately because rapid heating may lead to formation of foams and cracks in the film.

Exemplary apparatus for the drying process include, without limitation, hot-air dryers, far-infrared dryers and hot plates. The drying process can be conducted at a temperature ranging from about 50° C. to about 150° C. The drying time can vary, depending on the capacity of the dryer used, air flow, temperature and film thickness. An exemplary drying time is between about 1 and about 10 minutes.

Exemplary apparatus for the heat-curing process include without limitation, hot-air ovens, far-infrared ovens and hot plates. The heat-curing process can be conducted at a temperature ranging from about 150° C. to about 250° C. Curing may not be satisfactory below about 150° C. Meanwhile, depolymerization and carbonization of the polymers may occur above about 250° C. and deteriorate performance of the final film.

The film formed with the thermosetting resin composition of the present invention can be applied to a color filter for an image sensor.

Hereinafter, the present invention will be explained in more detail with reference to the following examples and comparative examples. However, these examples are given for the purpose of illustration and are not intended to limit the invention.

EXAMPLES

Example 1

After 600 g of propylene glycol monomethyl ether acetate is put into a 1,000 ml flask equipped with a reflux condenser and an agitator, the temperature is raised to 80° C. with stirring. A mixture of 25 g of glycidyl methacrylate, 13 g of 2-hydroxyethyl methacrylate, 15 g of methacrylic acid, 9 g of 9-anthracenemethyl methacrylate, 4 g of N-phenylmaleimide, 9 g of styrene, 100 g of methyl methacrylate and 20 g of dimethyl-2,2'-azobis(2-methylpropionate) is added dropwise to the flask for 1.5-2 hours while maintaining the temperature at 80° C. with stirring. The resulting mixture is allowed to react for 3-4 hours with stirring while maintaining the reaction temperature at 80° C. to obtain a solution (a) containing the random copolymer of Formula 7.

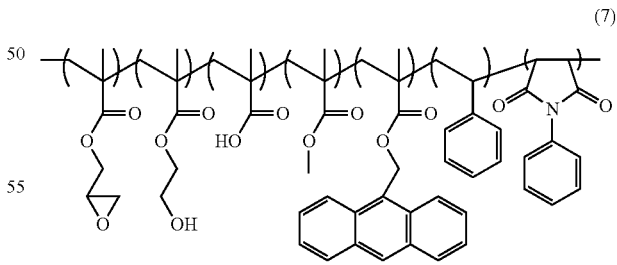

(7)

Gel permeation chromatography (GPC) of the polymer solution indicates a weight-average molecular weight of 14,500, as measured on a polystyrene basis.

To 20 g of the polymer solution (a) are added 1 g of an epoxy resin (jER-152, JER), 0.05 g of a surfactant (R-08, DIC) and 50 g of propylene glycol monomethyl ether acetate. The mixture is dissolved with sufficient stirring and filtered to obtain a thermosetting resin composition (e).

The thermosetting resin composition (e) is applied to a 0.7 mm thick glass substrate (#1737, Corning) using a spin coater, dried in a dryer at 80° C. for 3 minutes, and cured at 230° C. for 30 minutes to produce a 0.5 μm thick transparent film.

Example 2

After 600 g of propylene glycol monomethyl ether acetate is put into a 1,000 ml flask equipped with a reflux condenser and an agitator, the temperature is raised to 80° C. with stirring. A mixture of 30 g of glycidyl methacrylate, 10 g of 2-hydroxyethyl methacrylate, 15 g of methacrylic acid, 5 g of 2-hydroxy-4-methacryloyloxybenzophenone, 5 g of N-phenylmaleimide, 10 g of styrene, 50 g of methyl methacrylate and 8 g of dimethyl-2,2'-azobis(2-methylpropionate) is added dropwise to the flask for 1.5-2 hours while maintaining the temperature at 80° C. with stirring. The resulting mixture is allowed to react for 4-5 hours with stirring while maintaining the reaction temperature at 80° C. to obtain a solution (b) containing the random copolymer of Formula 8.

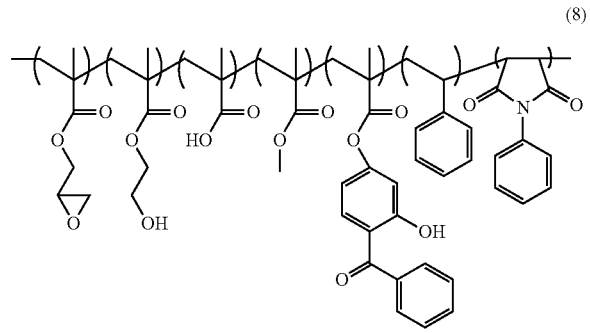

(8)

Gel permeation chromatography (GPC) of the polymer solution indicates a weight-average molecular weight of 11,000, as measured on a polystyrene basis.

A thermosetting resin composition (f) is prepared in the same manner as in Example 1, except that 40 g of the polymer solution (b) is used instead of the polymer solution (a).

A 0.5 μm thick transparent film is produced in accordance with the procedure described in Example 1, except that the thermosetting resin composition (f) is used instead of the thermosetting resin composition (e).

Example 3

After 600 g of propylene glycol monomethyl ether acetate is put into a 1,000 ml flask equipped with a reflux condenser and an agitator, the temperature is raised to 80° C. with stirring. A mixture of 30 g of glycidyl methacrylate, 10 g of 2-hydroxyethyl methacrylate, 15 g of methacrylic acid, 100 g methyl methacrylate, 10 g of 2-(2'-hydroxy-5'-methacryloyloxyphenyl)benzotriazole, 15 g of N-phenylmaleimide, 33 g of styrene and 8 g of dimethyl-2,2'-azobis(2-methylpropionate) is added dropwise to the flask for 1.5-2 hours while maintaining the temperature at 80° C. with stirring. The resulting mixture is allowed to react for 4-5 hours with stirring while maintaining the reaction temperature at 80° C. to obtain a solution (c) containing the random copolymer of Formula 9.

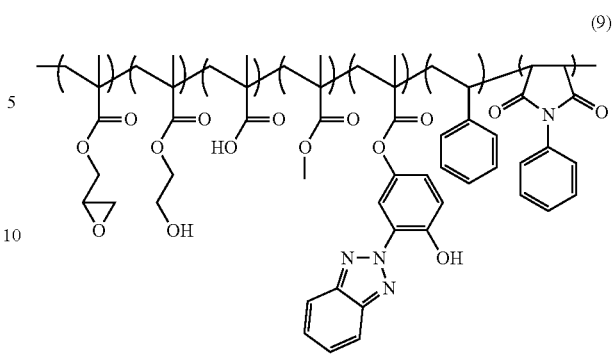

(9)

Gel permeation chromatography (GPC) of the polymer solution indicates a weight-average molecular weight of 9,500, as measured on a polystyrene basis.

A thermosetting resin composition (g) is prepared in the same manner as in Example 1, except that 40 g of the polymer solution (c) is used instead of the polymer solution (a).

A 0.5 μm thick transparent film is produced in accordance with the procedure described in Example 1, except that the thermosetting resin composition (g) is used instead of the thermosetting resin composition (e).

Comparative Example 1

After 600 g of propylene glycol monomethyl ether acetate is put into a 1,000 ml flask equipped with a reflux condenser and an agitator, the temperature is raised to 80° C. with stirring. A mixture of 30 g of glycidyl methacrylate, 13 g of dicyclopentanyl methacrylate, 12 g of styrene, 25 g of methyl methacrylate and 10 g of dimethyl-2,2'-azobis(2-methylpropionate) is added dropwise to the flask for 1.5-2 hours while maintaining the temperature at 80° C. with stirring. The resulting mixture is allowed to react for 4-5 hours with stirring while maintaining the reaction temperature at 80° C. to obtain a solution (d) containing the random copolymer of Formula 10.

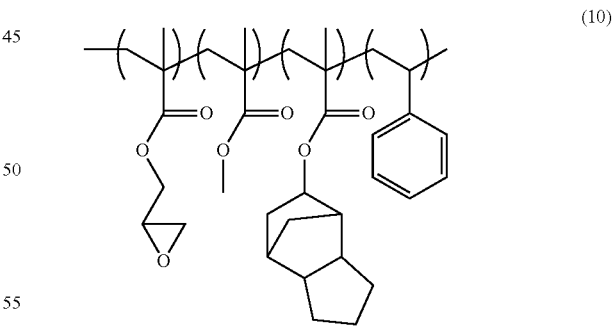

(10)

Gel permeation chromatography (GPC) of the polymer solution indicates a weight-average molecular weight of 13,000, as measured on a polystyrene basis.

A thermosetting resin composition (h) is prepared in the same manner as in Example 1, except that 40 g of the polymer solution (d) is used instead of the polymer solution (a).

A 0.5 μm thick transparent film is produced in accordance with the procedure described in Example 1, except that the thermosetting resin composition (h) is used instead of the thermosetting resin composition (e).

<Evaluation of Physical Properties>

The transparent films produced in Examples 1 to 3 and Comparative Example 1 are evaluated for flatness, adhesiveness, film hardness and transmittance in accordance with the following respective procedures. A color resist is applied to each of the transparent films, followed by patterning. The number of pattern defects caused by various adverse factors, e.g., halation, is counted. The results are shown in Table 1.

① Evaluation of Flatness

A height difference between central portions of red and green pixels (i.e. step height between the pixels) of a dummy color filter is measured. After each of the transparent films produced in Examples 1 to 3 and Comparative Example 1 is applied to the dummy color filter, the step height between the pixels of the color filter is measured. The ratio R of the step height (d1) before the application of the transparent film to the step height (d2) after the application of the transparent film is calculated by the equation (1) below:

$$R = d2/d1 \tag{1}$$

The flattening performance of the thermosetting resin compositions prepared in Examples 1 to 3 and Comparative Example 1 is classified into five grades based on the following criteria: $R>0.4$ ... Grade 1; $0.4 \geq R \geq 0.3$ ... Grade 2; $0.3 < R \leq 0.2$ ... Grade 3; $0.2 < R \leq 0.1$ ... Grade 4; $R < 0.1$ ... Grade 5.

The higher is the grade, the better the flattening performance.

② Tests for Adhesiveness and Chemical Resistance

After one hundred cross-cuts are scribed in the shape of cross stripes on each of the transparent films produced in Examples 1 to 3 and Comparative Example 1, a peeling test (a cross-cut test) is conducted using a cellophane tape. The peeling state of the cross-cuts is checked by visual inspection to evaluate the adhesiveness of the transparent film. When no cross-cut is peeled, the adhesiveness is judged to be 'passed'. When one or more cross-cuts are peeled, the adhesiveness is judged to be "failed."

Further, the transparent film pieces are separately dipped in N-methyl-2-pyrrolidone (NMP) as an organic solvent, a 10% aqueous basic potassium hydroxide solution and an acidic etchant solution (LCE-12K, CYANTEK CORPORATION) at 40° C. for 30 minutes, the procedure of the above adhesiveness test is repeated to evaluate the chemical resistance. The peeling state of the cross-cuts is observed. When no cross-cut is peeled after each dipping, the chemical resistance is judged to be "passed." When one or more cross-cuts are peeled after each dipping, the chemical resistance is judged to be "failed."

③ Evaluation of Film Hardness

After the transparent films produced in Examples 1 to 3 and Comparative Example 1 are scratched using six kinds (1H-6H) of pencils (Statdler), damage to the films is observed. The strength of the films is classified into six grades (1H-6H) according to the degree of the damage.

④ Evaluation of Pattern Defects (By halation)

Figure 2:
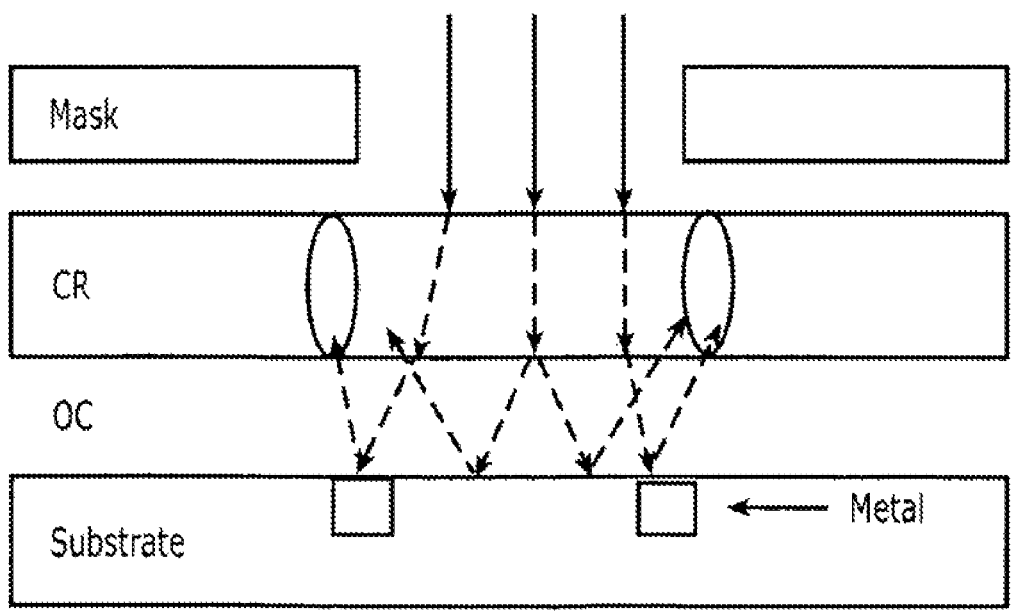
FIG. 2 is a schematic diagram illustrating a mechanism for an occurrence of pattern defects by light reflection.
Figure 3:
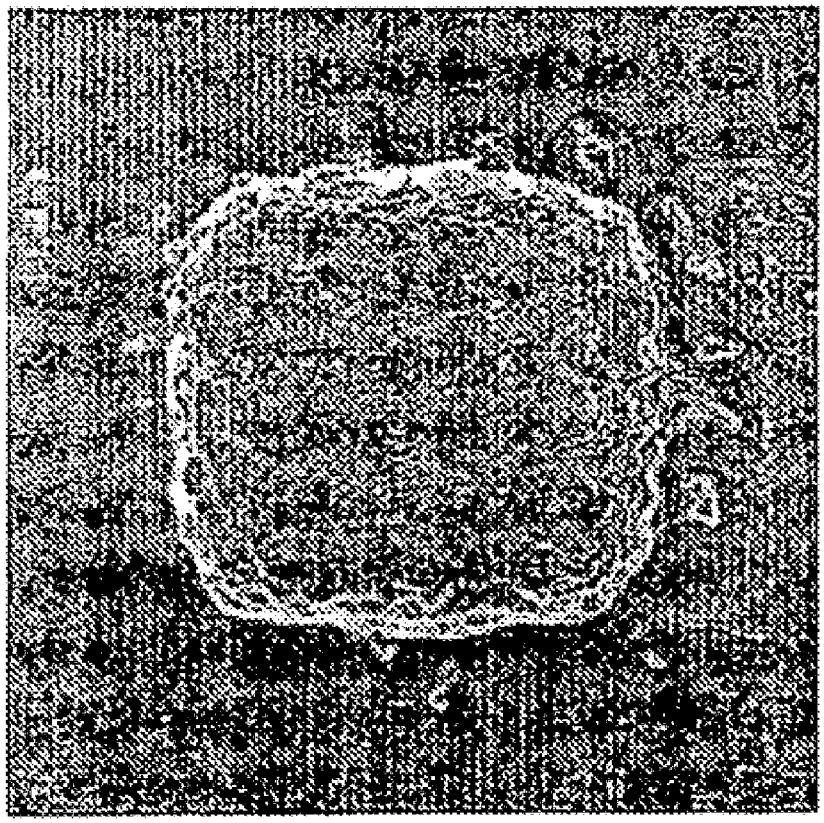
FIG. 3 shows shapes of a pattern obtained by applying a color resist for a CMOS image sensor to a transparent film formed in Comparative Example 1, exposing the color resist to light and developing the exposed color resist.
Figure 3:
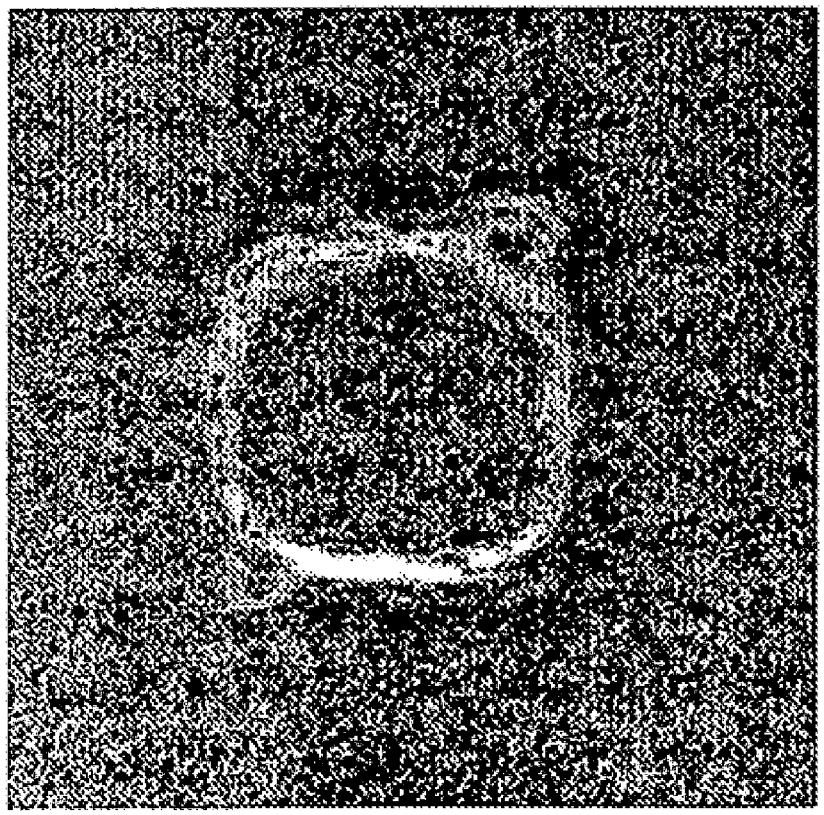
Figure 4:
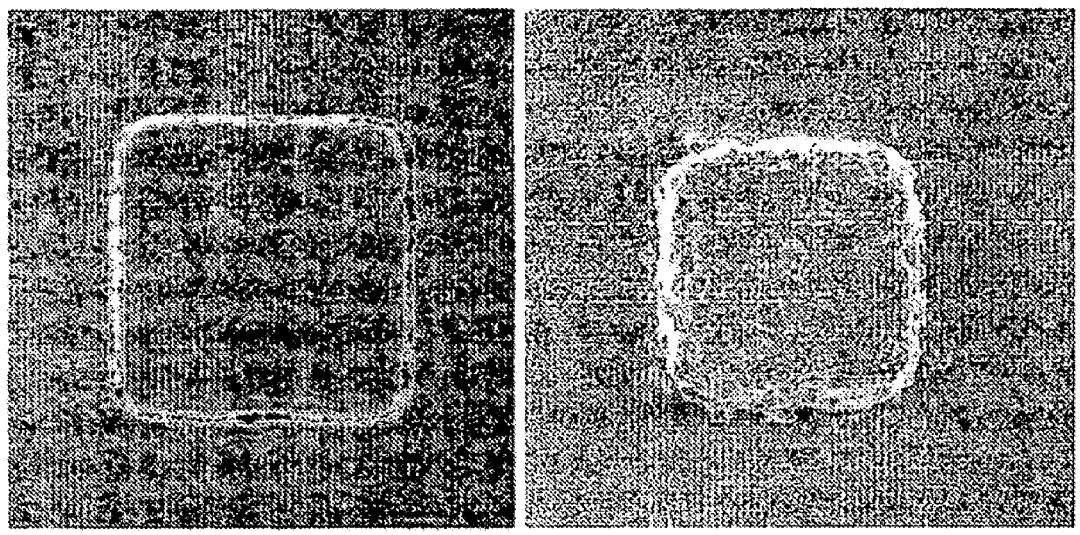
FIG. 4 shows shapes of a pattern obtained by applying a color resist for a CMOS image sensor to a transparent film formed in Example 1, exposing the color resist to light and developing the exposed color resist.

A color resist for a CMOS image sensor is applied to each of the transparent films formed in Examples 1 to 3 and Comparative Example 1, irradiated with light, and developed to form a pattern. The shape of the pattern is observed. The number of defects protruding from the boundaries of the pattern is counted. The pattern defects are caused due to reflection of UV light from the underlying substrate, as shown in FIG. 2. The shapes of the patterns formed using the transparent films produced in Comparative Example 1 and Example 1 are shown in FIGS. 3 and 4, respectively.

TABLE 1

| Physical Properties | | Example 1 | Example 2 | Example 3 | Comparative Example 1 |
|---|---|---|---|---|---|
| Flatness | | Passed | Passed | Passed | Passed |
| Adhesiveness (Cross cut) | | 100/100 | 100/100 | 100/100 | 95/100 |
| Film Hardness (Pensile Hardness) | | 4 H | 5 H | 4 H | 2 H |
| Chemical Resistance | Acid | Passed | Passed | Passed | Passed |
| | Base | Passed | Passed | Passed | Failed |
| | Organic solvent | Passed | Passed | Passed | Failed |
| Transmittance | 365 nm | 86.2% | 91.7% | 90.5% | 99.5% |
| | 400 nm | 98.6% | 99.5% | 99.2% | 99.8% |
| Pattern Defects | | 3/100 | 8/100 | 7/100 | 27/100 |

As can be seen from the results of Table 1, the transparent films produced using the thermosetting resin compositions prepared in Examples 1 to 3 showed excellent characteristics in terms of flatness, adhesiveness, transmittance in the visible region and film hardness. For example, the films are substantially transparent to the passage of radiation in the visible region and can exhibit, for example, a minimum transmittance of visible radiation having a wavelength of 400 nm of at least about 98%. In addition, the transparent films absorbed UV light of 365 nm, contributing to a marked decrease in the number of pattern defects. For example, the films of the invention can exhibit a maximum transmittance of radiation having a wavelength of 365 nm of about 92%.

As apparent from the foregoing, the thermosetting resin composition of the present invention is easy to handle and exhibits better chemical resistance than conventional two-part thermosetting resin compositions for producing color filters. In addition, a transparent film for a color filter produced using the thermosetting resin composition of the present invention exhibits excellent flatness, adhesiveness, transmittance, film strength and heat resistance. Furthermore, the thermosetting resin composition of the present invention has an ability to absorb UV light. Therefore, when the thermosetting resin composition of the present invention is used to produce a color filter for an image sensor, the number of pattern defects caused by halation and standing waves of re-reflected UV light can be decreased.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermosetting resin composition useful in the production of a color filter, the composition comprising an organic solvent and a self-curing copolymer comprising structural units represented by Formulae 1, 2, 3, 4, and 6:

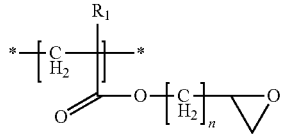
(1)

wherein $R_1$ is a hydrogen atom or a methyl group and n is an integer from 1 to 10;

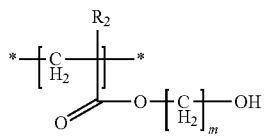
(2)

wherein $R_2$ is a hydrogen atom or a methyl group and m is an integer from 1 to 10;

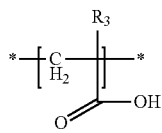
(3)

wherein $R_3$ is a hydrogen atom or a methyl group;

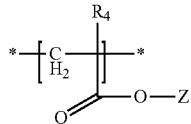
(4)

wherein $R_4$ is a hydrogen atom or a methyl group and Z is selected from the following groups:

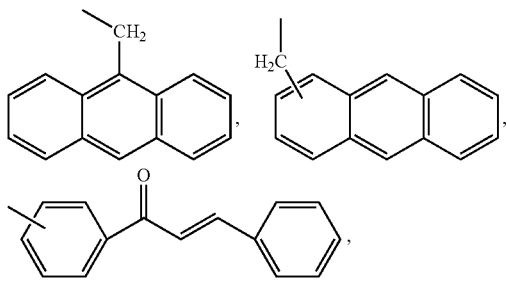
(5)

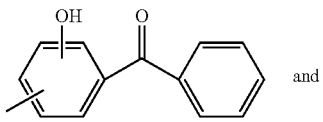
and

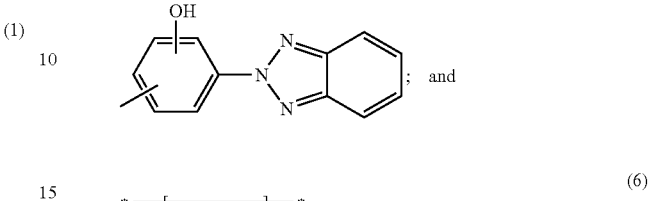
; and

(6)

wherein X is selected from

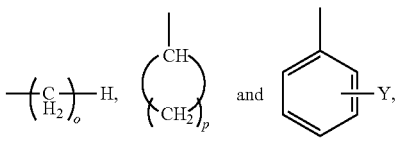

o is an integer from 1 to 4, p is an integer from 4 to 12, and Y is selected from a hydrogen atom, $C_1$-$C_4$ lower alkyl groups and $C_1$-$C_4$ lower alkoxy groups.

2. The thermosetting resin composition according to claim 1, wherein the self-curing copolymer comprises about 5 to about 90 mol % of the structural unit of Formula 1, about 1 to about 30 mol % of the structural unit of Formula 2, about 1 to about 30 mol % of the structural unit of Formula 3, and about 0.5 to about 20 mol % of the structural unit of Formula 4.

3. The thermosetting resin composition according to claim 1, wherein the self-curing copolymer comprises the structural unit of Formula 6 in an amount of about 0.5 to about 20 mol %.

4. The thermosetting resin composition according to claim 1, wherein the self-curing copolymer has a weight-average molecular weight ranging from about 1,000 to about 1,000,000.

5. The thermosetting resin composition according to claim 1, wherein said self-curing copolymer comprises a copolymer selected from the group consisting of

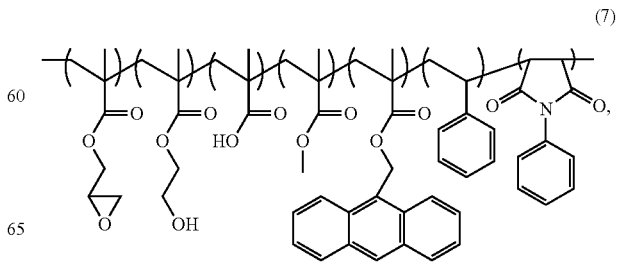
(7)

-continued

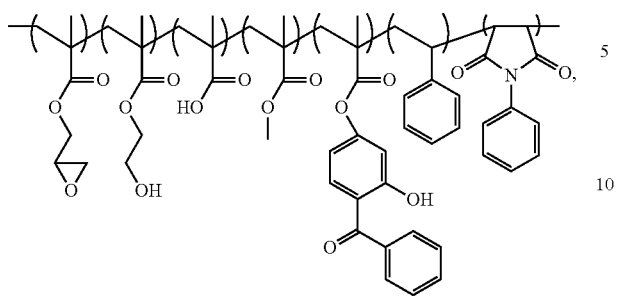
(8)

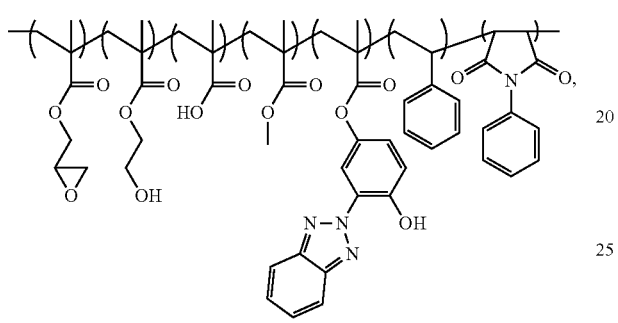
(9)

and mixtures thereof.

6. A substantially transparent film derived from a self-curing copolymer comprising structural units represented by Formulae 1, 2, 3, 4, and 6:

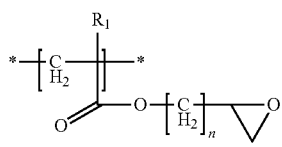
(1)

wherein $R_1$ is a hydrogen atom or a methyl group and n is an integer from 1 to 10;

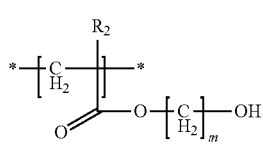
(2)

wherein $R_2$ is a hydrogen atom or a methyl group and m is an integer from 1 to 10;

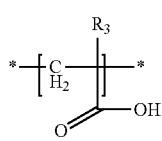
(3)

wherein $R_3$ is a hydrogen atom or a methyl group;

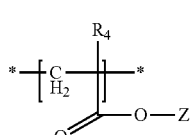
(4)

wherein $R_4$ is a hydrogen atom or a methyl group and Z is selected from the following groups:

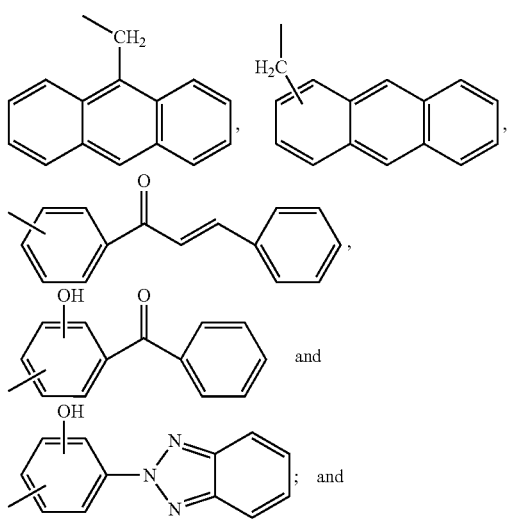
(5)

(6)

wherein X is selected from

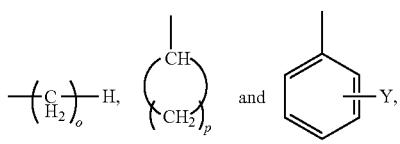

o is an integer from 1 to 4, p is an integer from 4 to 12, and Y is selected from a hydrogen atom, $C_1$-$C_4$ lower alkyl groups and $C_1$-$C_4$ lower alkoxy groups.

7. The film according to claim 6, wherein said film exhibits a maximum transmittance of radiation having a wavelength of 365 nm of about 92%.

8. The film according to claim 6, wherein said film exhibits a minimum transmittance of visible radiation having a wavelength of 400 nm of at least about 98%.

9. The film according to claim 6, wherein said film exhibits a pensil hardness of at least 4H, as determined by scratching the film using six kinds (1H-6H) of pencils (Statdler).

10. A color filter comprising a substantially transparent film derived from a self-curing copolymer comprising structural units represented by Formulae 1, 2, 3, 4, and 6:

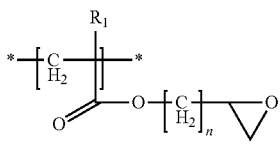
(1)

wherein $R_1$ is a hydrogen atom or a methyl group and n is an integer from 1 to 10;

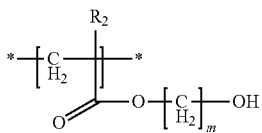
(2)

wherein $R_2$ is a hydrogen atom or a methyl group and m is an integer from 1 to 10;

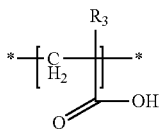
(3)

wherein $R_3$ is a hydrogen atom or a methyl group;

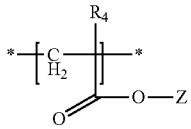
(4)

wherein $R_4$ is a hydrogen atom or a methyl group and Z is selected from the following groups:

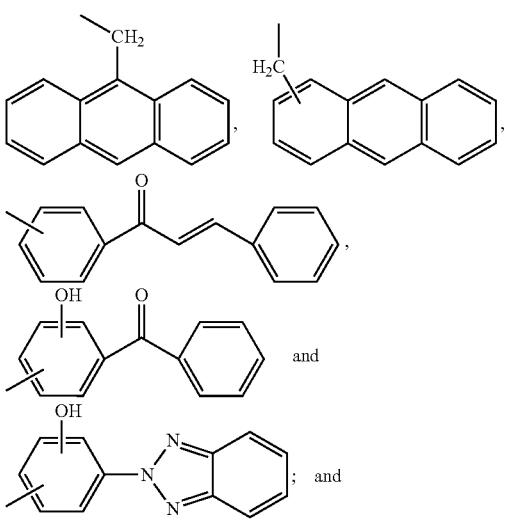
(5)

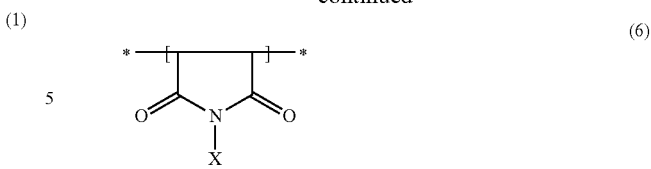
(6)

wherein X is selected from

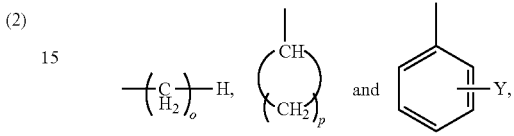

o is an integer from 1 to 4, p is an integer from 4 to 12, and Y is selected from a hydrogen atom, $C_1$-$C_4$ lower alkyl groups and $C_1$-$C_4$ lower alkoxy groups.

11. A color filter comprising a substantially transparent film formed using a thermosetting resin composition comprising an organic solvent and a self-curing copolymer comprising structural units represented by Formulae 1, 2, 3, 4, and 6:

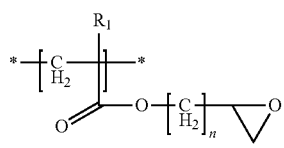
(1)

wherein $R_1$ is a hydrogen atom or a methyl group and n is an integer from 1 to 10;

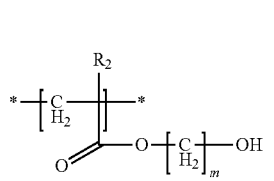
(2)

wherein $R_2$ is a hydrogen atom or a methyl group and m is an integer from 1 to 10;

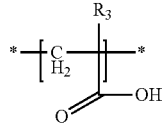
(3)

wherein $R_3$ is a hydrogen atom or a methyl group;

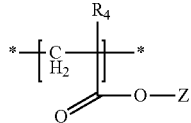
(4)

wherein $R_4$ is a hydrogen atom or a methyl group and Z is selected from the following groups:

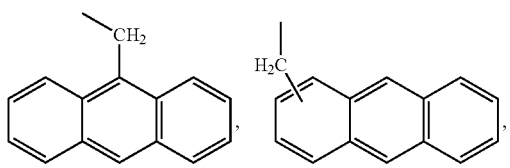
(5)

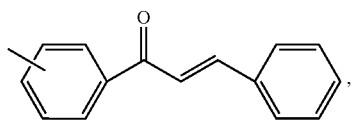

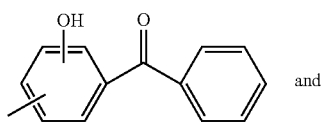
and

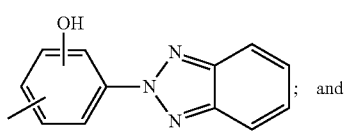
; and

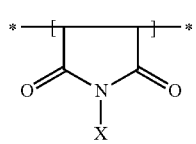
(6)

wherein X is selected from

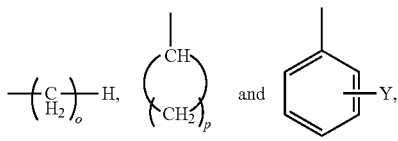

o is an integer from 1 to 4, p is an integer from 4 to 12, and Y is selected from a hydrogen atom, $C_1$-$C_4$ lower alkyl groups and $C_1$-$C_4$ lower alkoxy groups.

12. An image sensor comprising a color filter comprising a substantially transparent film derived from a self-curing copolymer comprising structural units represented by Formulae 1, 2, 3, 4, and 6:

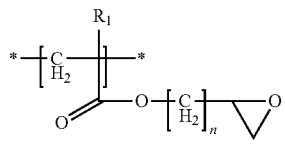
(1)

wherein $R_1$ is a hydrogen atom or a methyl group and n is an integer from 1 to 10;

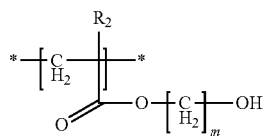
(2)

wherein $R_2$ is a hydrogen atom or a methyl group and m is an integer from 1 to 10;

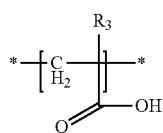
(3)

wherein $R_3$ is a hydrogen atom or a methyl group;

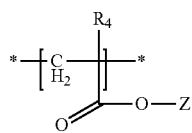
(4)

wherein $R_4$ is a hydrogen atom or a methyl group and Z is selected from the following groups:

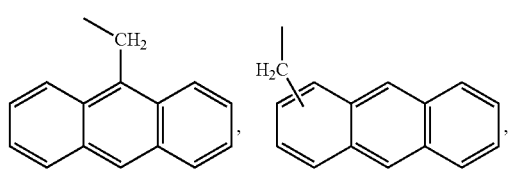
(5)

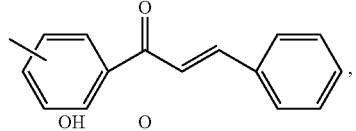

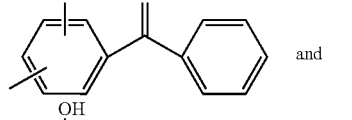
and

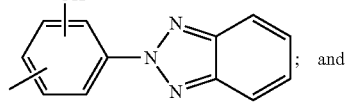
; and

-continued (6)

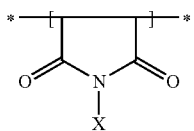

wherein X is selected from

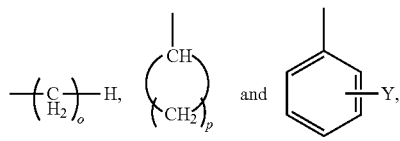

o is an integer from 1 to 4, p is an integer from 4 to 12, and Y is selected from a hydrogen atom, $C_1$-$C_4$ lower alkyl groups and $C_1$-$C_4$ lower alkoxy groups.

13. An image sensor comprising a color filter comprising a substantially transparent film formed using a thermosetting resin composition comprising an organic solvent and a self-curing copolymer comprising structural units represented by Formulae 1, 2, 3, 4, and 6:

(1)

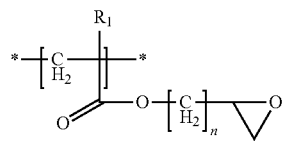

wherein $R_1$ is a hydrogen atom or a methyl group and n is an integer from 1 to 10;

(2)

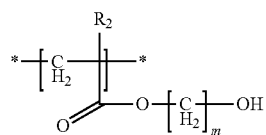

wherein $R_2$ is a hydrogen atom or a methyl group and m is an integer from 1 to 10;

(3)

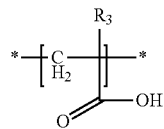

wherein $R_3$ is a hydrogen atom or a methyl group;

(4)

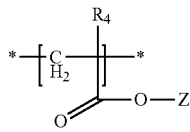

wherein $R_4$ is a hydrogen atom or a methyl group and Z is selected from the following groups:

(5)

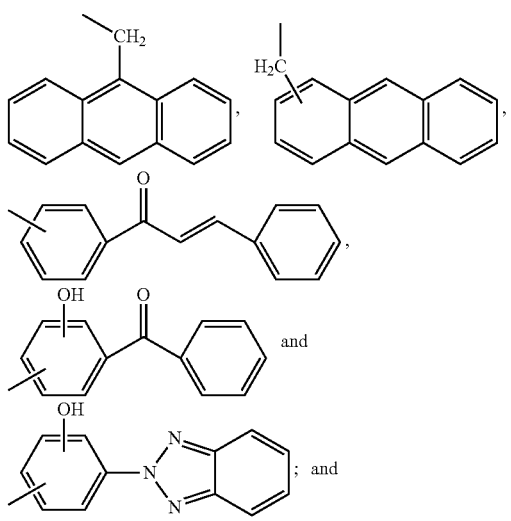

(6)

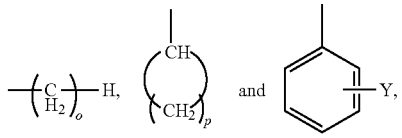

wherein X is selected from

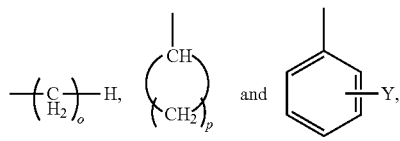

o is an integer from 1 to 4, p is an integer from 4 to 12, and Y is selected from a hydrogen atom, $C_1$-$C_4$ lower alkyl groups and $C_1$-$C_4$ lower alkoxy groups.

* * * * *